(12) United States Patent
Takamori

(10) Patent No.: US 6,985,647 B2
(45) Date of Patent: Jan. 10, 2006

(54) OPTICAL MODULE

(75) Inventor: Takeshi Takamori, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 121 days.

(21) Appl. No.: 10/765,860

(22) Filed: Jan. 29, 2004

(65) Prior Publication Data

US 2004/0184811 A1    Sep. 23, 2004

(30) Foreign Application Priority Data

Jan. 29, 2003  (JP)  ............................. 2003-019807

(51) Int. Cl.
  G02B 6/12   (2006.01)
  G02B 6/26   (2006.01)
  G02B 6/42   (2006.01)
  G02B 6/36   (2006.01)

(52) U.S. Cl. ........................... 385/14; 385/50; 385/52; 385/88; 385/92; 385/93

(58) Field of Classification Search ..................... None
See application file for complete search history.

(56) References Cited

U.S. PATENT DOCUMENTS

| | | | | |
|---|---|---|---|---|
| 5,611,006 | A * | 3/1997 | Tabuchi ....................... | 385/14 |
| 6,374,021 | B1 * | 4/2002 | Nakanishi et al. ............ | 385/49 |
| 6,839,474 | B2 * | 1/2005 | Steinberg et al. ............. | 385/14 |
| 6,904,190 | B2 * | 6/2005 | Korenaga et al. ............. | 385/14 |
| 2001/0026660 | A1 * | 10/2001 | Asakura et al. ............... | 385/47 |
| 2004/0264866 | A1 * | 12/2004 | Sherrer et al. ................ | 385/49 |

FOREIGN PATENT DOCUMENTS

JP      11-218651     8/1999
JP      2002-328204   11/2002

OTHER PUBLICATIONS

Masahiro Ogusu et al., "Receptacle-Type Bi-directional WDM Module I", The Institute of Electronics, Information Communication Engineers, Electronics Society in 1996, p. 208.
Sadayuki Miyata et al., "SC-type Hybrid Optical Module Integrating LD, PD and Coupler", The Institute of Electronics, Information and Communication Engineers, Electronics Society in 1997, p. 195.
T. Uno et al., "Hybridly integrated LD/PD module with passive-alignment technology", The Institute of Electronics Information and Communication Engineers, Electronics Society in 1997, p. 198.

* cited by examiner

Primary Examiner—Frank G. Font
Assistant Examiner—Charlie Peng
(74) Attorney, Agent, or Firm—Wenderoth, Lind & Ponack, L.L.P.

(57) ABSTRACT

At V-shaped grooves 112a and 112b on a substrate 110, an optical fiber 150 and lens elements 130a and 130b each having a fitting portion with an external diameter substantially equal to the external diameter of the optical fiber 150 are positioned and mounted. A wavelength branching filter 140 is disposed in a concave groove 114 formed on the substrate 110, and a PD 160 is set at the upper surface of the wavelength branching filter 140. An LD 120 and the optical fiber 150 are optically coupled via the lens elements 130a and 130b. Light with wavelength lambda 1 emitted from the LD 120 is transmitted through the wavelength branching filter 140 and enters the optical fiber 150. Light with wavelength lambda 2 emitted from the optical fiber 150 is deflected at the wavelength branching filter 140 and enters the PD 160.

18 Claims, 6 Drawing Sheets

OPTICAL MODULE

BACKGROUND OF THE INVENTION

The present invention relates to an optical module and, more specifically, an optical module ideal in an application in which two or more light signals with varying wavelengths that are propagated through a single optical fiber are transmitted/received.

In the field of optical communication and particularly in the field of subscriber optical communication, a typical example of which is fiber to the home (FTTH) communication, it is becoming increasingly common to adopt the single-conductor bidirectional communication method. This method enables communication of data and the like by propagating two different light signals with varying wavelengths bidirectionally through a single optical fiber. It achieves higher efficiency in the optical fiber utilization compared to the other method in which bidirectional optical communication is realized by using two optical fibers, one of the optical fibers used for communication along a given direction and the other optical fiber used for communication along the other direction. Such single-conductor bidirectional communication may be achieved by adopting, for instance, a multiple wavelength system whereby the bidirectional optical communication is executed by propagating light signals with varying wavelengths along opposite directions from each other through a single optical fiber. The light signals used in such an application typically have wavelengths of 1.3 $\mu$m and 1.5 $\mu$m.

In the single-conductor bidirectional communication method described above, a light signal with a transmission wavelength lambda 1 may originate at point A at one end of a single optical fiber and a light signal with wavelength lambda 2 which is different from lambda 1 may originate at point B at the other end of the optical fiber. In this case, the light signal with wavelength lambda 1 transmitted from point A is received at point B, and likewise, the light signal with wavelength lambda 2 transmitted from point B is received at point A. Since the light signals with wavelength lambda 1 and the wavelength lambda 2 are propagated along directions opposite from each other through the optical fiber, a branching filter having a function of identifying and differentiating the individual wavelengths is normally installed at each end of the optical fiber.

FIG. 8 schematically illustrates a structure that may be adopted to implement the method described above. In the example presented in FIG. 8, a branching filter 2a is connected to one end of a single optical fiber 1 on the point A side with a laser diode (hereafter abbreviated to LD) 3a and a photodiode (hereafter abbreviated to PD) 4a connected to the branching filter 2a. In addition, a branching filter 2b is connected at another end of the optical fiber 1 on the point B side and an LD 3b and a PD 4b are connected to the branching filter 2b. Light with wavelength lambda 1 emitted from the LD 3a passes through the branching filter 2a and becomes divided at the branching filter 2b before entering the PD 4b. Likewise, light with wavelength lambda 2 emitted from the LD 3b passes through the branching filter 2b and is divided at the branching filter 2a before entering the PD 4a.

A transmission/reception module having such a branching function and also having both a light signal transmission function and a light signal reception function integrated therein may be utilized at homes and offices. For this reason, it is crucial to provide a transmission/reception module that can be offered as a compact, inexpensive unit so as to achieve further popularization of optical communication.

Now, in reference to FIG. 9, a transmission/reception module utilized in single-conductor bidirectional optical communication in a first example of the related art is explained (see C-208, p 208 "Receptacle-type Bidirectional Multiple Wavelength Optical Module I" by Masahiro Ogusu et al., the Electronic Information Communication Conference, a Electronics Society, 1996). In this module, a wavelength filter 21 achieving wavelength selectivity is secured inside a rectangular parallelepiped housing 20. In addition, an optical fiber 27, an LD 22 and a PD 23 are secured to an outer back of the housing 20, with an optical fiber lens 24, an LD lens 25 and a PD lens 26 respectively fixed onto the optical fiber 27, the LD 22 and the PD 23.

A light signal with wavelength lambda 1 emitted from the LD 22 is converted to a parallel beam at the lens 25, is reflected by the wavelength filter 21 to change its advancing direction by 90° and is condensed through the optical fiber lens 24 to reach the optical fiber 27. A light signal with wavelength lambda 2 having been propagated through the optical fiber 27, on the other hand, is converted to a parallel beam at the optical fiber lens 24, is transmitted through the wavelength filter 21 and is condensed onto the PD 23 via the PD lens 26. The functions as a transmission/reception module for single-conductor bidirectional optical communication are achieved by adopting the structure described above.

In reference to FIG. 10, a transmission/reception module for single-conductor bidirectional optical communication achieved in a second example of the related art is explained (see Japanese Laid Open Patent Publication No. H 11-218651). This module, which includes a V-grooved substrate 52 having an optical guide 51 constituted of quartz, adopts the following structure. A V-shaped groove 53 is provided at one end on the V-grooved substrate 52, and an optical fiber 54 is secured onto the V-shaped groove 53. A diagonal slit 55 constituted of a narrow diagonal groove is provided halfway through the optical guide 51. A wavelength filter 56 is inserted at the diagonal slit 55. A hole 57 through which a light signal can travel is formed at the substrate directly under the wavelength filter 56. A PD 58 is disposed over an area of the substrate rear surface that connects with the hole 57, and an LD 59 is set at the trailing end portion of the optical guide 51.

Another priority art literature related to the present invention is Japanese Laid Open Patent Publication No. 2002-328204.

SUMMARY OF THE INVENTION

However, the structure in the first example of the related art described above requires precise alignment of the individual components, i.e., the optical fiber 27, the LD 22, the PD 23, the optical fiber lens 24, the LD lens 25 and the PD lens 26 so as to align their optical axes. For this reason, the structure in the first example of the related art gives rise to a problem in that the manufacturing costs cannot be easily reduced.

The second example of the related art poses a problem in that since the process of forming the diagonal slit and inserting the wavelength filter at the diagonal slit is not simple, the yield is bound to be poor and thus the production costs is bound to be high. In addition, since the LD is directly coupled with the wave-guiding channel with no lens or the like present between them, the coupling efficiency at the connecting area is poor and thus, the light quantity loss is significant. While this problem may be addressed by employing an LD with a spot size conversion function so as to improve the coupling efficiency, such an LD is expensive and presents a further hindrance to a cost-reduction. There is another problem in that the optical guide constituted of quartz, which is difficult to manufacture and thus does not give a good yield, is bound to be costly.

An object of the present invention, which has been completed by addressing the problems discussed above, is to provide an optical module that achieves both a cost-reduction and a higher degree of optical coupling efficiency.

In order to achieve the object described above, a first aspect of the present invention provides an optical module comprising a substrate having formed at a surface thereof first and second grooves adopting a first structure and a groove at which a branching filter is disposed, adopting a second structure and located between the first groove and the second groove both adopting the first structure, an optical fiber having one end thereof set at the first groove adopting the first structure, a light emitting element that emits light with a first wavelength, a first lens element having a fitting portion with an external diameter substantially matching the external diameter of the optical fiber and set at the second groove adopting the first structure, which converts divergent light emitted from the light emitting element to substantially parallel light, a second lens element having a fitting portion with an external diameter substantially matching the external diameter of the optical fiber and set at the first groove adopting the first structure, through which the substantially parallel light is converted to convergent light and the convergent light enters the optical fiber, a wavelength branching filter set at the groove adopting the second structure at a position set within an optical path extending between the optical fiber and the light emitting element, which has a function of branching light with varying wavelengths, and a light-receiving element at which light with a second wavelength emitted from the optical fiber enters via the wavelength branching filter.

A second aspect of the present invention provides an optical module comprising a substrate having formed at a surface thereof first and second grooves adopting a first structure and a groove, at which a branching filter is disposed adopting a second structure and located between the first groove and the second groove both adopting the first structure, an optical fiber having one end thereof set at the first groove adopting the first structure, a light emitting element that emits light with a first wavelength, a lens element having a fitting portion with an external diameter substantially matching the external diameter of the optical fiber and set at the second groove adopting the first structure, through which divergent light emitted from the light emitting element is converted to convergent light and the convergent light enters the optical fiber, a wavelength branching filter set at the groove adopting the second structure at a position set within an optical path extending between the optical fiber and the light emitting element, which has a function of branching light with varying wavelengths, and a light-receiving element at which light with a second wavelength emitted from the optical fiber enters via the wavelength branching filter.

A third aspect of the present invention provides an optical module comprising a substrate having formed at a surface thereof first and second grooves adopting a first structure and a groove where a branching filter is disposed, adopting a second structure and located between the first groove and the second groove both adopting the first structure, an optical fiber having one end thereof set at the first groove adopting the first structure, a light emitting element that emits light with a first wavelength, a first lens element having a fitting portion with an external diameter substantially matching the external diameter of the optical fiber and set at the second groove adopting the first structure, which converts divergent light emitted from the light emitting element to substantially parallel light, a second lens element having a fitting portion with an external diameter substantially matching the external diameter of the optical fiber and set at the first groove adopting the first structure, through which the substantially parallel light is converted to convergent light and the convergent light enters the optical fiber, a plurality of wavelength branching filters set at the groove adopting the second structure at positions within an optical path extending between the optical fiber and the light emitting element, which achieve wavelength selectivity for wavelengths different from one another, and light-receiving elements each provided in correspondence to one of the wavelength branching filters, at which light having been emitted from the optical fiber and branched at the wavelength branching filters enters.

By setting the optical fiber and fitting portions of the lens elements at the groove adopting the first structure, they can be aligned relative to each other with ease. This eliminates the need for performing a complicated process of carefully aligning the individual optical components as required in the related art, thereby enabling mass production of the optical module at a low production cost. In addition, by coupling the optical fiber and the light emitting element via the lens element, the optical fiber and the light emitting element can be coupled with a high degree of efficiency. By constituting each lens element with quartz or silicon, the optical system can be manufactured at low-cost without having to use resin to constitute the component, which makes it possible to withstand the heat treatment. By adopting one of the structures described above that includes a wavelength branching filter, a bidirectional optical transmission/reception module is achieved.

DETAILED DESCRIPTION OF THE PREFERRED EMBODIMENTS

Figure 1:
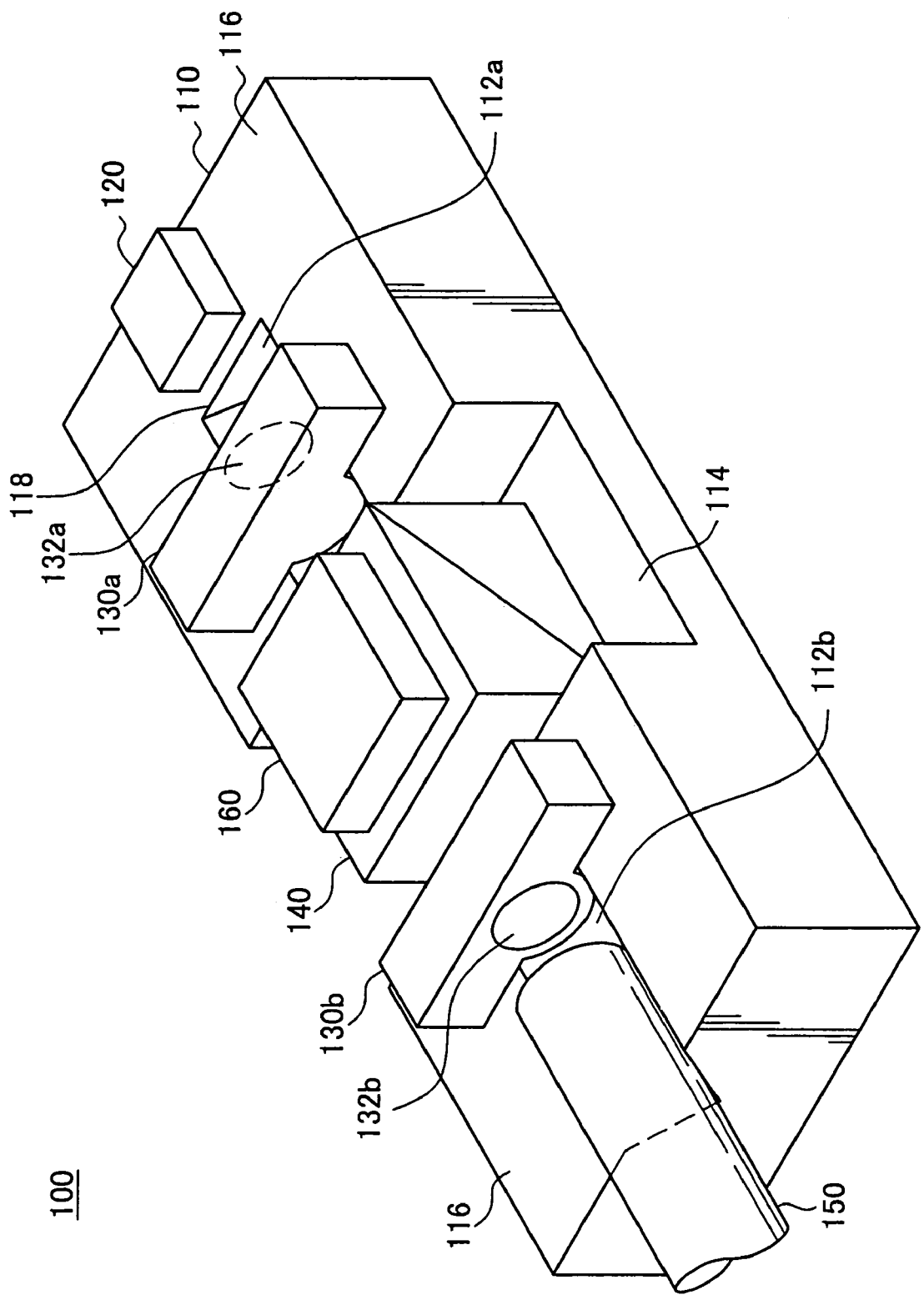
FIG. 1 is a perspective of the structure adopted in the optical module achieved in a first embodiment of the present invention.

The following is a detailed explanation of the preferred embodiments of the present invention, given in reference to the drawings. It is to be noted that in the following explanation and the attached drawings, the same reference numerals are assigned to components having substantially identical functions and structural features to preclude the necessity for a repeated explanation thereof.

The optical module achieved in a typical mode of implementation of the present invention is an optical transmission/reception module for bidirectional optical communication adopting the following structure. A substrate is prepared by forming at a surface thereof two V-shaped grooves with a V-shaped section and a concave groove set between the two V-shaped grooves and having a flat bottom surface, at which a branching filter is set. A transmission light emitting element constituted of an LD capable of emitting light with wavelength lambda 1 is set on the substrate near the trailing end portion of one of the V-shaped grooves. A first lens element is disposed at this V-shaped groove. The first lens element has a function of converting a light signal from the LD to a substantially parallel beam. In addition, a lower portion of the first lens element has a radius equal to the radius of an optical fiber, and the first lens element is aligned as the lower portion is mounted at the V-shaped groove. The optical fiber is disposed at the other V-shaped groove so as to face opposite the LD. A second lens element is disposed at this other V-shaped groove as well. The second lens element has a function of converting the light having been converted to a parallel beam at the first lens element to convergent light and causing the convergent light to enter the optical fiber. The second lens element also has a function of converting a light signal from the optical fiber to a substantially parallel beam. The lower portion of the second lens element has a radius equal to that of the optical fiber and the second lens element is aligned as the lower portion is mounted at the V-shaped groove. A wavelength branching filter having a wavelength branching function is set at the concave groove. A receiving PD is disposed along the direction in which a light signal having been branched at the wavelength branching filter resulting in a change in the propagating direction thereof is propagated.

Figure 2:
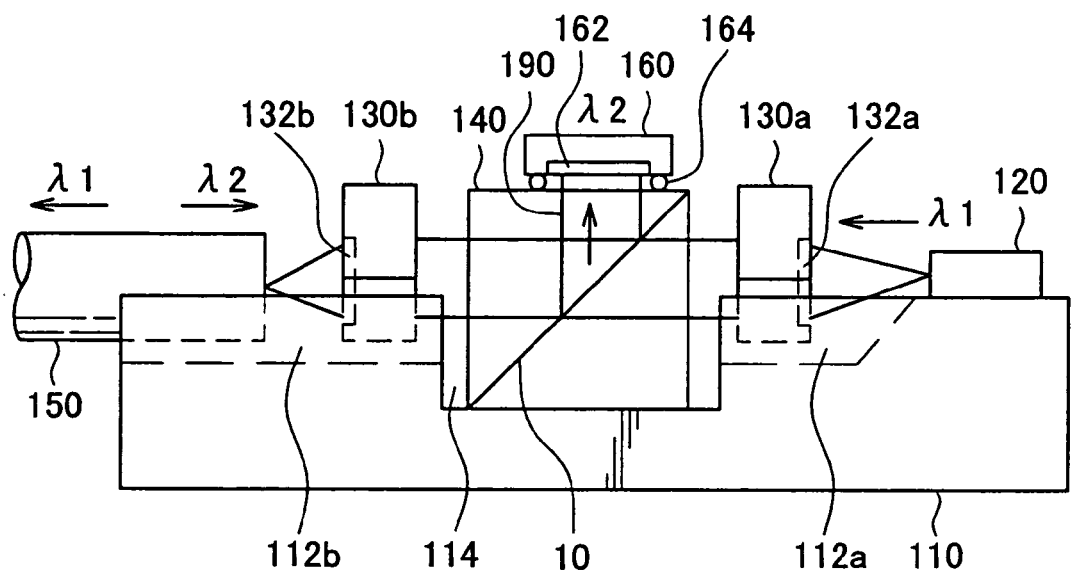
FIG. 2 is a side elevation of the optical module shown in FIG. 1.
Figure 3:
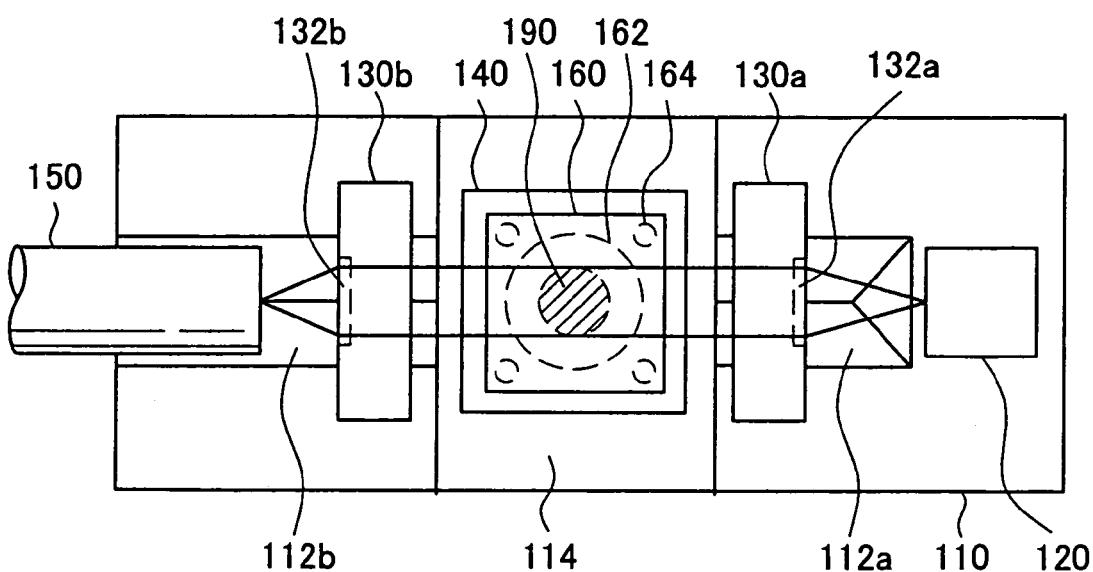
FIG. 3 is a top view of the optical module shown in FIG. 1.

FIGS. 1, 2 and 3 are respectively a perspective, a side elevation and a top view of the structure adopted in an optical module 100 in the first embodiment of the present invention. The optical module 100 is an optical transmission/reception module used in single-conductor bidirectional optical communication. The optical module 100 comprises a substrate 110, an LD 120, two lens elements 130a and 130b, a wavelength branching filter 140, an optical fiber 150 and a PD 160.

The substrate 110 may be constituted of a silicon substrate since the manufacturing technology through which silicon substrate platforms are manufactured has matured greatly in recent years. At the upper surface of the substrate 110, two V-shaped grooves 112a and 112b and a concave groove 114 are formed. The two V-shaped grooves 112a and 112b are formed on the two sides of the concave groove 114 on a single straight line so that the V-shaped grooves communicate with the concave groove 114. The V-shaped groove 112a is formed to extend from the concave groove 114 to a trailing end portion 118 located in the middle range of the substrate 110, whereas the V-shaped groove 112b is formed to extend from the concave groove 114 to one end of the substrate 110.

The V-shaped grooves 112a and 112b have a V-shaped section and achieve a groove structure which allows one end of the optical fiber 150 to be set therein. The V-shaped grooves 112a and 112b are formed in dimensions that set the height of the optical axis of the optical fiber 150 at a point higher than an upper surface 116 of the substrate 110 by a few microns when one end of the optical fiber 150 is set therein.

The V-shaped grooves 112a and 112b are formed through precision manufacturing so as to achieve a structure having a (111) plane group constituted of a silicon crystalline plane at sloping surfaces thereof. Such a structure may be achieved for the V-shaped grooves 112a and 112b through etching after forming a pattern on the silicon substrate surface by using a photoresist or the like. For instance, an etching solution achieving crystalline plane selectivity such as KOH (potassium hydroxide) may be used to form the V-shaped grooves by taking advantage of the extremely low etching rate of the (111) plane group at the sloping surfaces and their vicinity relative to the etching rate at a (100) plane and the like.

The concave groove 114, where the wavelength branching filter 140 is disposed, has a groove structure having a flat bottom surface. While the section of the concave groove 114 has a substantially rectangular shape in this embodiment, the present invention is not limited to this example. The concave groove 114 can be formed through dicing or the like.

The LD 120 is a light emitting element which emits transmission light with wavelength lambda 1. The LD 120 is set between the trailing end portion 118 of the V-shaped groove 112a on the substrate 110 and one end of the substrate 110. The LD 120 is set with precision so that its light emitting position is at a height equal to the height of the optical axis of the optical fiber 150. This type of precision setting along the horizontal direction parallel to the upper surface 116 of the substrate 110 may be achieved by adopting an image recognition technology in conjunction with a metal pattern (not shown) provided at the bottom surface of the LD 120 or the external shape of the LD 120 and a metal pattern (not shown) provided over the area at the upper surface 116 of the substrate 110 where the LD 120 is set. In addition, the precision setting along the direction perpendicular to the upper surface 116 of the substrate 110 may be achieved with ease by implementing accurate control as the crystal is grown when forming the LD 120 and orienting the crystal growing plane so as to make it face opposite the upper surface 116 of the substrate 110.

The optical fiber 150 is a single-mode fiber with a 125 µm diameter. One end of the optical fiber 150 is set in the V-shaped groove 112b.

With the concave groove 114 set at the center, the lens element 130a is disposed at the V-shaped groove 112a closer to the LD 120, whereas the lens element 130b is disposed at the V-shaped groove 112b closer to the optical fiber 150. The lens elements 130a and 130b, each constituted of an optical substrate such as a quartz substrate or a silicon substrate, respectively include lens portions 132a and 132b each formed at one of the surfaces of the optical substrate. The lens portions 132a and 132b are designed so as to optically couple the LD 120 and the optical fiber 150 and realize efficient optical coupling by converting the spot diameters of the light beams emitted from the LD 120 and the optical fiber 150. The lens elements 130a and 130b differ from each other only in the optical performance of the lens portions 132a and 132b, and otherwise they assume structures identical to each other with regard to their forms. While an explanation is given below on the lens element 130a in reference to FIG. 4, the same principle applies to the lens element 130b, as well.

Figure 4:
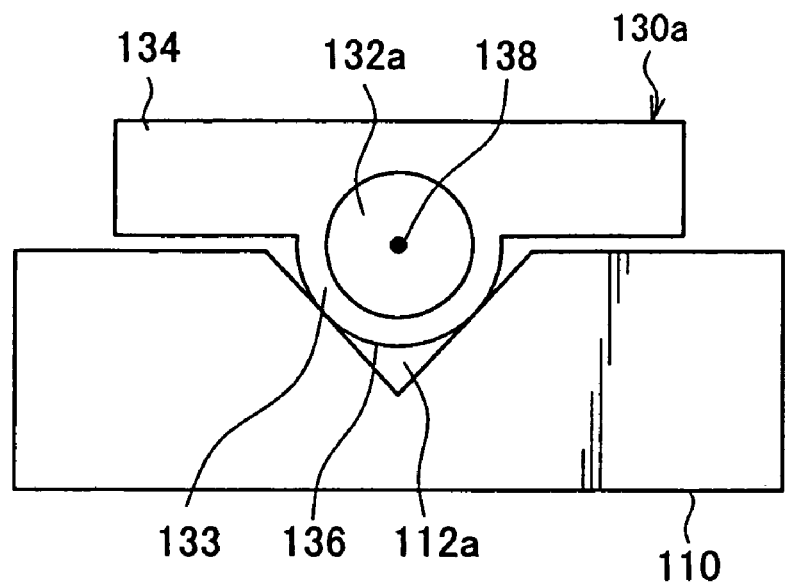
FIG. 4 is an enlargement of an essential portion of the optical module with a lens element set at a V-shaped groove.

FIG. 4 is an enlargement of an essential portion of the optical module with the lens element 130a mounted at the V-shaped groove 112a of the substrate 110. The lens element 130a mainly comprises the lens portion 132a, a handling portion 134 having a width greater than that of the lens portion 132a, and a fitting portion 136 having an external diameter equal to the external diameter of the optical fiber 150.

The lens portion 132a, which is formed at one surface of the optical substrate in this example, is round in shape and is constituted of a diffractive optical element. Such a lens portion 132a may be manufactured through, for instance, photolithography technology and the etching technology used in semiconductor manufacturing. Hereafter, the surface of the lens element at which the lens portion is formed is to be referred to as a lens formation plane.

The handling portion 134 connects with the lens portion 132a on the side toward the upper portion of the external circumference of the lens portion 132a, has a width greater than the width of the lens portion 132a within a plane substantially parallel to the surface of the lens portion 132a, and assumes an overall shape of a rectangular parallelopiped extending along the lateral direction. The upper surface of the handling portion 134, which is provided to facilitate the handling of the lens element, is flat.

An edge portion 133 constituting a portion of the external circumference of the lens portion 132a is located along the bottom of the lens portion 132a. The edge portion 133 assumes the shape of a circular arc running along the circumference of the lens portion 132a. The contour of the edge portion 133 assuming the shape of a circular arc extends from the lens formation plane side of the lens portion 132a to the surface facing opposite the lens formation plane, and the part of the lens element that projects downward from the handling portion 134 and includes the edge portion 133, forms the substantially semi-cylindrical fitting portion 136 achieving a shape that fits the V-shaped groove 112a.

As shown in FIG. 4, the fitting portion 136 comes in contact with the V-shaped groove 112a when the lens element 130a is mounted at the substrate 110. The radius of the circular arc of the fitting portion 136 is equal to the radius of the optical fiber 150. The external diameter of the fitting portion 136 is set at φ 125 µm, which is equal to the external diameter of the optical fiber 150. This structure makes it possible to align an optical axis 138 of the lens portion 132a relative to the optical axis of the optical fiber 150 and the emission point of the LD 120 along the direction perpendicular to the upper surface 116 of the substrate 110, simply by setting the lens element 130a in the V-shaped groove 112a.

The lens element 130a can be manufactured through photolithography technology and the etching technology used in the manufacture of semiconductors. For instance, the lens portion 132a constituted of a diffractive optical element is formed as the silicon substrate repeatedly undergoes photolithography steps and etching steps. Subsequently, by etching the silicon substrate to a desired depth through deep etching or the like with a pattern achieving a shape corresponding to that of the lens element 130a used as a photo mask pattern, the lens element 130a is prepared. This type of lens element is disclosed in Japanese Patent Laid-Open Publication No. 2002-328204.

The lens element 130b adopts a structure similar to that of the lens element 130a. As the fitting portions of the two lens elements 130a and 130b are set at the corresponding V-shaped grooves, the lens elements are aligned along the vertical direction and the optical axes at the centers of the individual lens portions are set with precision relative to the optical axis of the optical fiber 150 and the emission point of the LD 120.

The optical module adopts a structure in which the lens portion 132a of the lens element 130a converts the light emitted from the LD to a parallel beam and the lens portion 132b of the lens element 130b converts the light emited from the optical fiber 150 to a parallel beam in this embodiment. It is to be noted that while the lens formation plane of the lens element 130a is oriented to face opposite the LD 120 and the lens formation plane of the lens element 130b is oriented to face opposite the optical fiber 150 in this example, the orientations of the lens formation planes are not limited to these.

Figure 5:
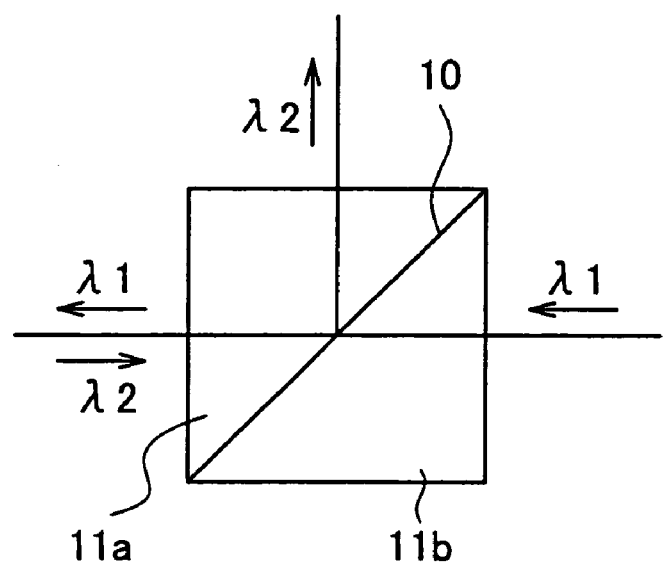
FIG. 5 illustrates the function and the structure of the wavelength branching filter.

The wavelength branching filter 140 is disposed at the concave groove 114. The wavelength branching filter 140 having wavelength selectivity achieves a function of branching light with varying wavelengths. For instance, when light beams with two different wavelengths lambda 1 and lambda 2 enter the wavelength branching filter 140, the wavelength branching filter 140 allows the light with wavelength lambda 1 to be transmitted and reflects light with wavelength lambda 2. The wavelength branching filter 140 may be constituted with, for instance, a multilayer film mirror. The wavelength branching filter 140 adopts a structure achieved by sandwiching a dielectic multilayer film 10 with two glass blocks 11a and 11b, as shown in FIG. 5. The dielectic multilayer film 10 has a function of allowing the light with wavelength lambda 1 to be transmitted and reflecting the light with wavelength lambda 2.

As shown in FIG. 2, the wavelength branching filter 140 is set so as to orient the dielectic multilayer film 10 along a direction that runs at a 45° angle relative to the optical axis of the light emitted from the optical fiber 150. As a result, the light with wavelength lambda 2 emitted from the optical fiber 150 is reflected upward at a 90° angle relative to the optical axis of the optical fiber 150. This reflected light is indicated as a vertical parallel beam 190 in FIG. 2.

In addition, the PD 160, which receives light, is set and fixed with solder 164 at the upper surface of the wavelength branching filter 140 so that a light-receiving portion 162 of the PD 160 faces opposite the wavelength branching filter 140. The PD 160 is constituted of a plane entry type light-receiving element. In this embodiment, the PD 160 is placed directly at the wavelength branching filter 140 without a lens, a spacer or the like provided between them. It is to be noted that the vertical parallel beam 190 is indicated as the shaded area in FIG. 3.

The individual components explained above are first set at specific positions and then are fixed to the positions with a metal adhesive such as solder or a heat resistant adhesive.

The operation of the optical module 100 structured as described above is now explained. A light signal with wavelength lambda 1 emitted from the LD 120 is converted to a parallel beam at the lens element 130a, is transmitted through the wavelength branching filter 140, is condensed toward the optical fiber 150 at the lens element 130b and is thus transmitted.

In addition, a light signal with wavelength lambda 2 having entered from the outside toward the optical module 100 and having been propagated through the optical fiber 150 is emitted from the trailing end portion of the optical fiber 150 set at the V-shaped groove 112b. This emitted light is then converted to a parallel beam at the lens element 130b, enters the wavelength branching filter 140, is reflected at the dielectic multilayer film 10 of the wavelength branching filter 140 to advance along the direction perpendicular to the upper surface 116 of the substrate 110 and enters the PD 160 as the vertical parallel beam 190 as indicated by the arrow in FIG. 2. By ensuring that the light that enters the PD 160 is parallel light, the alignment of the PD 160 is facilitated. The optical module 100 fulfills its function as a bidirectional transmission/reception module as described above.

By adopting the structure explained above, numerous advantages are achieved as described below in the embodiment. The complicated process of aligning the optical axes of the components, which was the problem of the first example of the related art, can be greatly simplified in the optical module in the embodiment to achieve a cost-reduction and mass production of the optical module. In addition, by optically coupling the optical fiber and the LD via the lens elements, the optical fiber and the LD can be coupled with a high degree of efficiency. The two lens elements can be mass-produced in a batch on the substrate constituted of quartz or silicon with a large diameter through integrated circuit manufacturing technology. By using lens elements manufactured as described above, the cost of the lens elements themselves can be greatly reduced.

Figure 10:
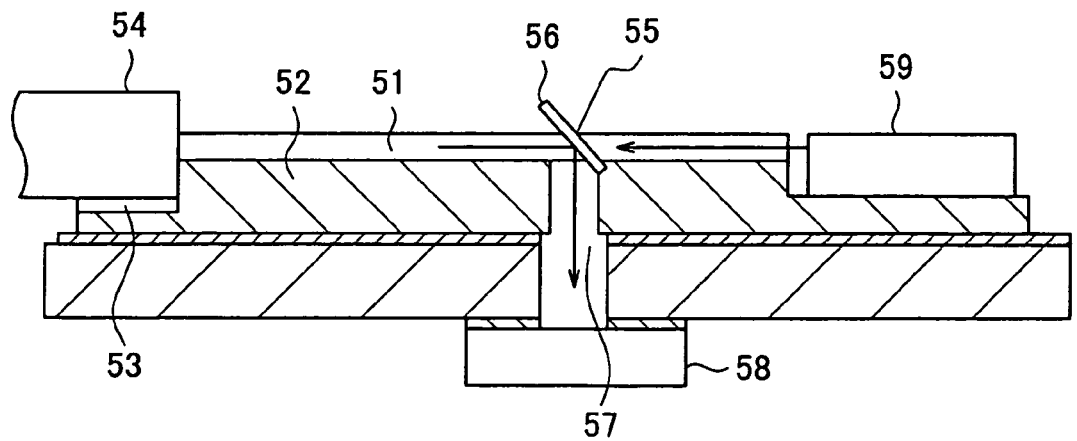
FIG. 10 is a sectional view of the structure of an optical module in the related art.

It is to be noted that an optical guide constituted of resin instead of an optical guide constituted of quartz, as shown in FIG. 10, must be used in the related art in order to achieve a cost reduction. However, an optical guide constituted of resin does not have good heat resistance. For this reason, the resin optical guide has a problem of its characteristics becoming greatly degraded during the process for fixing the LD or the PD after the optical guide is manufactured or during the heat treatment process referred to as a reflow process, which is normally executed after the optical module is mounted on a printed board or the like. In contrast, in the embodiment, all the components can be fixed with solder or a heat resisting resin achieving high heat resistance, and thus, the performance level does not become lowered during the module manufacturing process or during the heat treatment process which needs to be executed as a post treatment. As a result, a high production yield is assured and an optical module achieving high heat resistance can be provided by adopting the embodiment.

It is to be noted that while the light travels in a parallel beam between the lens elements 130a and the lens element 130b in the embodiment explained above, the present invention is not limited to this example. For instance, the present invention may be adopted in an optical module in which the light beam diameter changes, e.g., the light beam diameter gradually increases, between the lens elements 130a and 130b as well.

Figure 6:
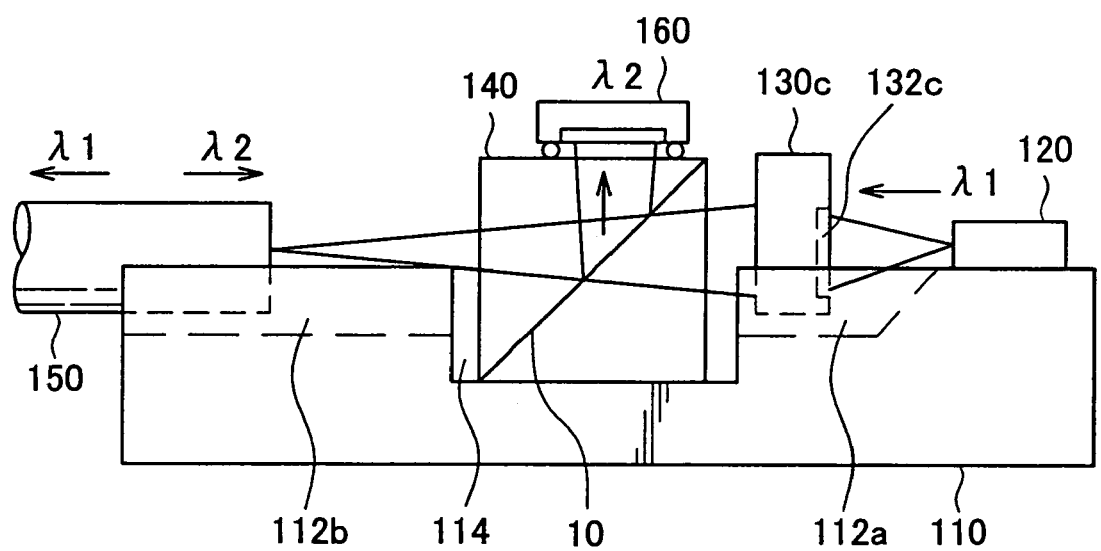
FIG. 6 is a side elevation showing the structure of an optical module achieved as a variation according to the present invention.

FIG. 6 is a side elevation showing the structure adopted in a variation of the optical module achieved in the embodiment described above. While optical coupling is achieved by using two lens elements in the optical module 100 in the embodiment, the optical module achieved in the example of a variation presented in FIG. 6 differs from the optical module 100 in that optical coupling is achieved with a single lens element. The following explanation focuses on this difference, and a repeated explanation of the structural features identical to those in the embodiment is omitted.

In the example of a variation, a single lens element 130c is disposed at the V-shaped groove 112a located between the LD 120 and the wavelength branching filter 140, and no lens element is provided at the V-shaped groove 112b extending between the wavelength branching filter 140 and the optical fiber 150. While the lens element 130c assumes a structure similar to that of the lens elements 130a and 130b, the optical performance of its lens portion 132c is different from the optical performance of the lens portions of the lens elements 130a and 130b. The lens portion 132c is designed so that light with wavelength lambda 1 emitted from the LD 120 is converted to convergent light at the lens element 130c and that after the light is transmitted through the wavelength branching filter 140, it converges onto and enters the optical fiber 150.

In addition, a light signal with wavelength lambda 2 having been propagated through the optical fiber 150 is emitted from the trailing end portion of the optical fiber 150 as divergent light, and the divergent light entering the wavelength branching filter 140 is reflected along the vertical direction at the dielectic multilayer film 10 to enter the PD 160 as divergent light. The optical module in this example of a variation, too, fulfills the function as a bidirectional transmission/reception module as described above.

In this example, the LD 120 and the optical fiber 150 are optically coupled via a single lens element. Since the number of lens elements is reduced compared to that in the first embodiment, a further cost reduction is achieved. In addition, since the light that enters the PD 160 is divergent light, the alignment of the PD 160 is facilitated in the example of a variation.

It is to be noted that while the lens portion is only formed at one surface of the lens element 130c, lens portions may be formed at two opposite surfaces of the lens element 130c, instead.

While an explanation is given above in reference to the embodiment and the example of a variation on an application in which light beams with two different wavelengths are transmitted/received in the optical module 100, the present invention may also be adopted to propagate light with three or more different wavelengths by providing the required number of wavelength branching filters each having a wavelength filter corresponding to one of the wavelengths.

Figure 7:
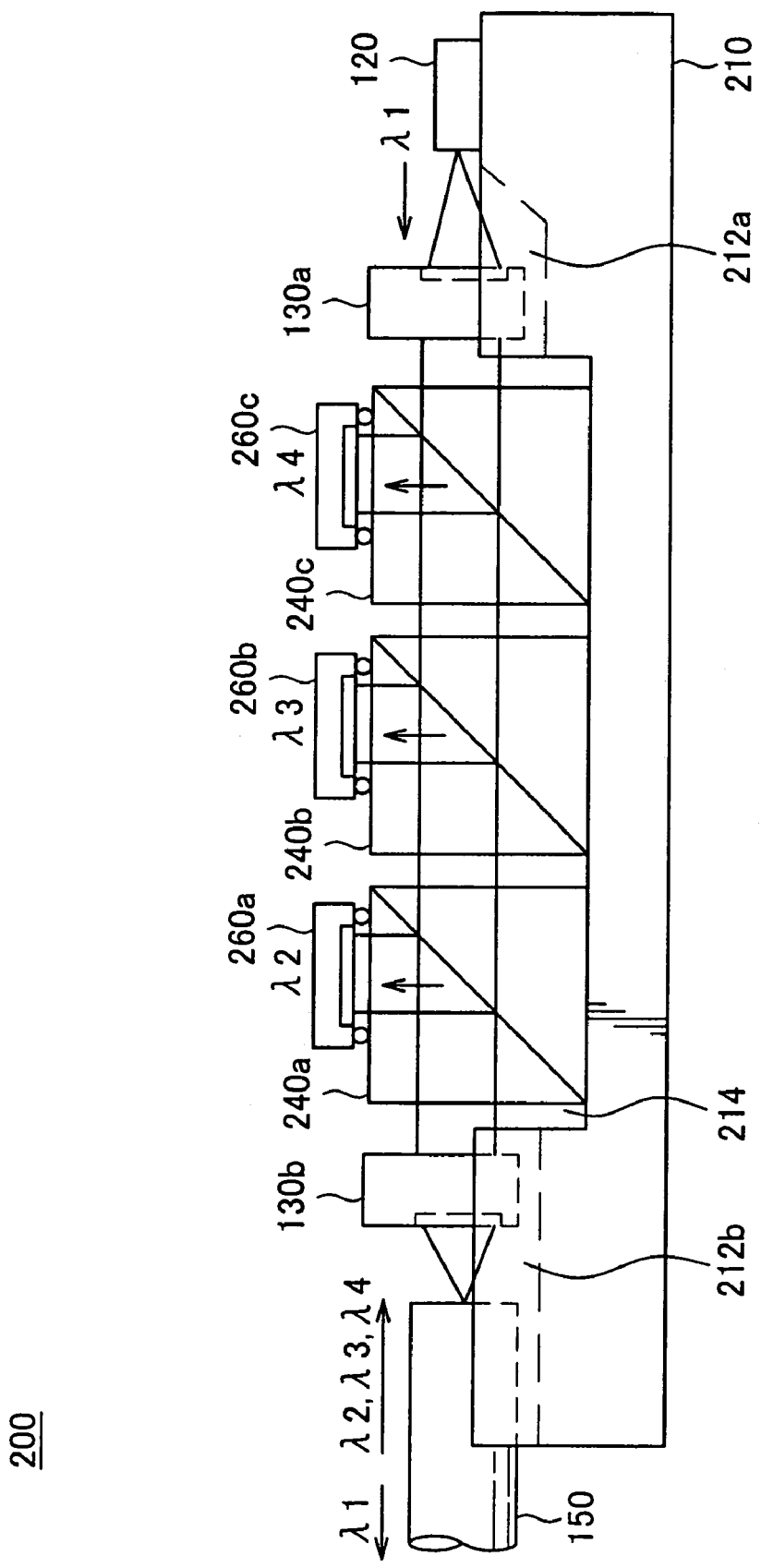
FIG. 7 is a side elevation of the structure adopted in the optical module achieved in a second embodiment of the present invention.
Figure 8:
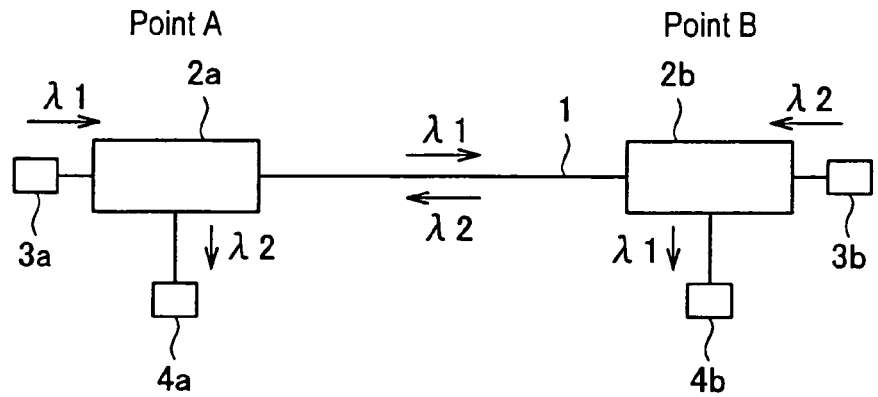
FIG. 8 schematically illustrates a standard structure adopted to achieve multiple wavelength bidirectional communication.
Figure 9:
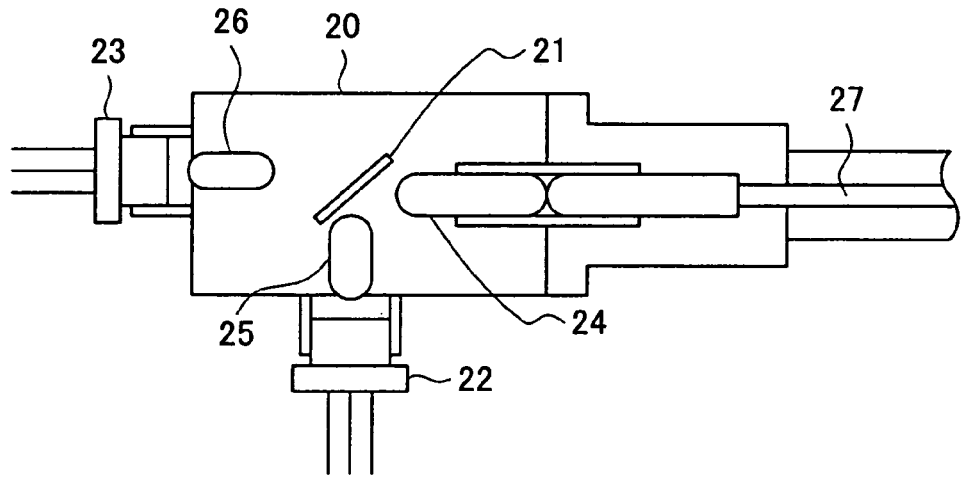
FIG. 9 is a sectional view of the structure of an optical module in the related art.

FIG. 7 is a side elevation showing the structure of an optical module 200 achieved in the second embodiment of the present invention. As is the optical module 100 achieved in the first embodiment, the optical module 200 is an optical transmission/reception module used in single-conductor bidirectional optical communication. It however, the optical module 200 differs from the optical module 100 in that three wavelength branching filters and three PDs are provided to enable transmission/reception of light beams with four different wavelengths lambda 1, lambda 2, lambda 3 and lambda 4. The following explanation focuses on this difference, and a repeated explanation of the structural features identical to those in the first embodiment is omitted.

The optical module 200 comprises a substrate 210, an LD 120, two lens elements 130a and 130b, three wavelength branching filters 240a, 240b and 240c, an optical fiber 150 and three PDs 260a, 260b and 260c.

At the upper surface of the substrate 210, a concave groove 214 and V-shaped grooves 212a and 212b located on the two sides of the concave groove 214 are formed, as in the case of the substrate 110 used in the first embodiment. The V-shaped grooves 212a and 212b are similar to the V-shaped grooves 112a and 112b achieved in the first embodiment in that they are set so as to extend on a single straight line, that their sections are V-shaped and that they adopt a groove structure which allows one end of the optical fiber 150 to be set therein.

The concave groove 214, at which the three wavelength branching filters are disposed, adopts a groove structure having a flat bottom surface, and the shape of its section is substantially rectangular in this example. The concave groove 214 is formed to have a greater length along the optical axis compared to the concave groove 114 in the first embodiment so as to accommodate therein the three wavelength branching filters.

The three wavelength branching filters 240a, 240b and 240c are disposed in this order inside the concave groove 214 along the direction extending from the optical fiber 150 toward the LD 120, as shown in FIG. 7. The wavelength branching filters 240a, 240b and 240c each adopt a structure achieved by sandwiching a dielectric multilayer film having wavelength selectivity with two glass blocks as does the wavelength branching filter 140 shown in FIG. 5, and they each have a branching filter function of reflecting light with a specific wavelength and allowing light with other wavelengths to be transmitted. The wavelength branching filters 240a, 240b and 240c achieve wavelength selectivity for wavelengths different from one another. For instance, when there are light beams with varying wavelengths lambda 1, lambda 2, lambda 3 and lambda 4, the wavelength branching filter 240a reflects light with wavelength lambda 2 and allows light beams with other wavelengths to be transmitted, the wavelength of branching filter 240b reflects light with the wavelength lambda 3 and allows light beams with other wavelength to be transmitted, and the wavelength branching filter 240c reflects light with wavelength lambda 4 and allows light beams with other wavelengths to be transmitted.

The PDs 260a, 260b and 260c each constituted of a plane entry type light-receiving element are directly disposed at the upper surfaces of the wavelength branching filters 240a, 240b and 240c respectively so that the light-receiving portions of the PDs 260a, 260b and 260c face opposite the corresponding wavelength branching filters.

The operation of the optical module 200 structured as described above is now explained. A light signal with wavelength lambda 1 emitted from the LD 120 is converted to a parallel beam at the lens element 130a, is transmitted through the wavelength branching filters 240a, 240b and 240c, is condensed toward the optical fiber 150 at the lens element 130b and is thus transmitted.

In addition, a light signal with wavelength lambda 2 having entered from the outside toward the optical module 200 and having been propagated through the optical fiber 150 is emitted from the trailing end portion of the optical fiber 150 located at the V-shaped groove 112b. The light thus emitted is then converted to a parallel beam at the lens element 130b, is reflected at the wavelength branching filter 240a to advance along the vertical direction and enters the PD 260a. Likewise, a light signal with wavelength lambda 3 having been propagated through the optical fiber 150 is emitted from the trailing end portion of the optical fiber 150, is converted to a parallel beam at the lens element 130b, is reflected at the wavelength branching filter 240b to advance along the vertical direction after being transmitted through the wavelength branching filter 240a and enters the PD 260b.

A light signal with wavelength lambda 4 having been propagated through the optical fiber 150 is emitted from the trailing end portion of the optical fiber 150, is converted to a parallel beam at the lens element 130b, is reflected at the wavelength branching filter 240c to advance along the vertical direction after being transmitted through the wavelength branching filter 240a and the wavelength branching filter 240b and enters the PD 260c. Thus, the light signals with three varying wavelengths emitted from the optical fiber 150 are branched in correspondence to the individual wavelengths and are then received in the module 200.

As a result, the embodiment achieves an advantage in that light beams with four different wavelengths can be bidirectionally transmitted and received in addition to the advantages of the first embodiment. It is to be noted that the number of different wavelengths of light that can be transmitted/received in the optical module is not limited to that in the example described above. By providing the appropriate number of wavelength branching filters and PDs and setting the dimensions of the concave groove accordingly, any number of wavelengths of light can be received/transmitted.

While an explanation is given above in reference to the embodiments on an example in which the present invention is adopted in an optical transmission/reception module wherein light signals with varying wavelengths advance along directions opposite from each other, the present invention may also be adopted in a module in which light signals with varying wavelengths advance along a single direction by replacing certain members with alternative members. For instance, an optical transmission module having a transmission function alone may be achieved by replacing the PD with an LD capable of emitting light with a specific wavelength and a lens element. In addition, an optical reception module having a reception function alone may be achieved by replacing the LD with a PD.

While an explanation is given above in reference to the embodiments on an example in which a PD is directly disposed on a wavelength branching filter, a condenser lens, a spacer for gap adjustment or the like may be provided between the PD and the wavelength branching filter, instead. Furthermore, while an explanation is given above in reference to the embodiments on an example in which a light signal is reflected at a wavelength branching filter to advance along the direction perpendicular to the upper surface of the the V-grooved substrate, the present invention is not limited to this example and the light signal may instead be reflected to advance along a direction substantially parallel to the upper surface of the V-grooved substrate or a direction running at a specific angle to the upper surface of the V-grooved substrate.

The shapes of the lens elements, the lens portions, the handling portions, the fitting portions, the V-shaped grooves, the concave groove and the like are not limited to those adopted in the examples explained above, and they may take on various other shapes. The lens portions may be constituted of refractive lenses. In addition, as long as the lens elements and the optical fiber can be positioned and mounted at the V-shaped grooves, the V-shaped grooves may take on any other shape, and the shape of their sections may be substantially trapezoidal, semicircular, rectangular, or square. The concave groove, too, needs only to have a structure which allows a wavelength branching filter to be mounted therein, and the shape of its section does not need to be rectangular.

While the light emitted from the LD and the light emitted from the optical fiber are converted to parallel lightbeams at the lens elements in the first and second embodiments, the light does not need to be converted to completely parallel light and the light beams may be converted to only substantially parallel beams light instead.

While the invention has been particularly shown and described with respect to preferred embodiments thereof by referring to the attached drawings, the present invention is not limited to these examples and it will be understood by those skilled in the art that various changes in form and detail may be made therein without departing from the spirit, scope and teaching of the invention.

As explained in detail above, the present invention provides an optical module that achieves a cost reduction and allows a light emitting element and an optical fiber to be coupled with a high degree of efficiency.

What is claimed is:

1. An optical module comprising:
a substrate having formed at a surface thereof a first groove and a second groove both adopting a first structure and a third groove at which a branching filter is disposed adopting a second structure and located between said first groove and said second groove both adopting said first structure;
an optical fiber having one end thereof set at said first groove adopting said first structure;
a light emitting element that emits light with a first wavelength;
a first lens element having a fitting portion with an external diameter substantially matching the external diameter of said optical fiber and set at said second groove adopting said first structure, which converts divergent light emitted from said light emitting element to substantially parallel light;
a second lens element having a fitting portion with an external diameter substantially matching the external diameter of said optical fiber and set at said first groove adopting said first structure, through which the substantially parallel light is converted to convergent light and the convergent light enters said optical fiber;
a wavelength branching filter set at said third groove adopting said second structure at a position set within an optical path extending between said optical fiber and said light emitting element, which has a function of branching light with varying wavelengths; and
a light-receiving element at which light with a second wavelength emitted from said optical fiber enters via said wavelength branching filter.

2. An optical module according to claim 1, wherein:
the light entering said light-receiving element is a substantially parallel light beam.

3. An optical module according to claim 1, wherein:
said light-receiving element is constituted of a plane entry type light-receiving element.

4. An optical module according to claim 1, wherein:
said light-receiving element is directly disposed at said wavelength branching filter.

5. An optical module according to claim 1, wherein:
said lens elements are each constituted of quartz or silicon.

6. An optical module according to claim 1, wherein:
lens portions of said lens elements are each constituted of a diffractive optical element.

7. An optical module comprising:
a substrate having formed at a surface thereof a first groove and a second groove both adopting a first structure and a third groove at which a branching filter is disposed, adopting a second structure and located between said first groove and said second groove both adopting said first structure;
an optical fiber having one end thereof set at said first groove adopting said first structure;
a light emitting element that emits light with a first wavelength;
a lens element having a fitting portion with an external diameter substantially matching the external diameter of said optical fiber and set at said second groove adopting said first structure, through which divergent light emitted from said light emitting element is converted to convergent light and the convergent light enters said optical fiber;
a wavelength branching filter set at said third groove adopting said second structure at a position set within an optical path extending between said optical fiber and said light emitting element, which has a function of branching light with varying wavelengths; and
a light-receiving element at which light with a second wavelength emitted from said optical fiber enters via said wavelength branching filter.

8. An optical module according to claim 7, wherein:
the light entering said light-receiving element is divergent light.

9. An optical module according to claim 7, wherein:
said light-receiving element is constituted of a plane entry type light-receiving element.

10. An optical module according to claim 7, wherein:
said light-receiving element is directly disposed at said wavelength branching filter.

11. An optical module according to claim 7, wherein:
said lens element is constituted of quartz or silicon.

12. An optical module according to claim 7, wherein:
a lens portion of said lens element is constituted of a diffractive optical element.

13. An optical module comprising:
a substrate having formed at a surface thereof a first groove and a second groove both adopting a first structure and a third groove at which a branching filter is disposed adopting a second structure located between said first groove and said second groove both adopting said first structure;
an optical fiber having one end thereof set at said first groove adopting said first structure;
a light emitting element that emits light with a first wavelength;
a first lens element having a fitting portion with an external diameter substantially matching the external diameter of said optical fiber and set at said second groove adopting said first structure, through which divergent light emitted from said light emitting element is converted to substantially parallel light;
a second lens element having a fitting portion with an external diameter substantially matching the external diameter of said optical fiber and set at said first groove adopting said first structure, through which the parallel light is converted to convergent light and the convergent light enters said optical fiber;
a plurality of wavelength branching filters set at said third groove adopting said second structure at positions set within an optical path extending between said optical fiber and said light emitting element and having wavelength selectivity for wavelengths different from one another; and
light-receiving elements at which light having been emitted from said optical fiber and branched at said wavelength branching filters enters, each provided in correspondence to one of said wavelength branching filters.

14. An optical module according to claim 13, wherein:
the light entering said light-receiving elements is a substantially parallel light beam.

15. An optical module according to claim 13, wherein:
said light-receiving elements are each constituted of a plane entry type light-receiving element.

16. An optical module according to claim 13, wherein:
said light-receiving elements are directly disposed at said wavelength branching filters.

17. An optical module according to claim 13, wherein:
said lens elements are constituted of quartz or silicon.

18. An optical module according to claim 13, wherein:
lens portions of said lens elements are each constituted of a diffractive optical element.

\* \* \* \* \*